March 29, 1955
R. D. DREW
2,705,216
METHOD AND APPARATUS FOR CONVERTING HYDROCARBONS
Filed March 18, 1952
2 Sheets-Sheet 1
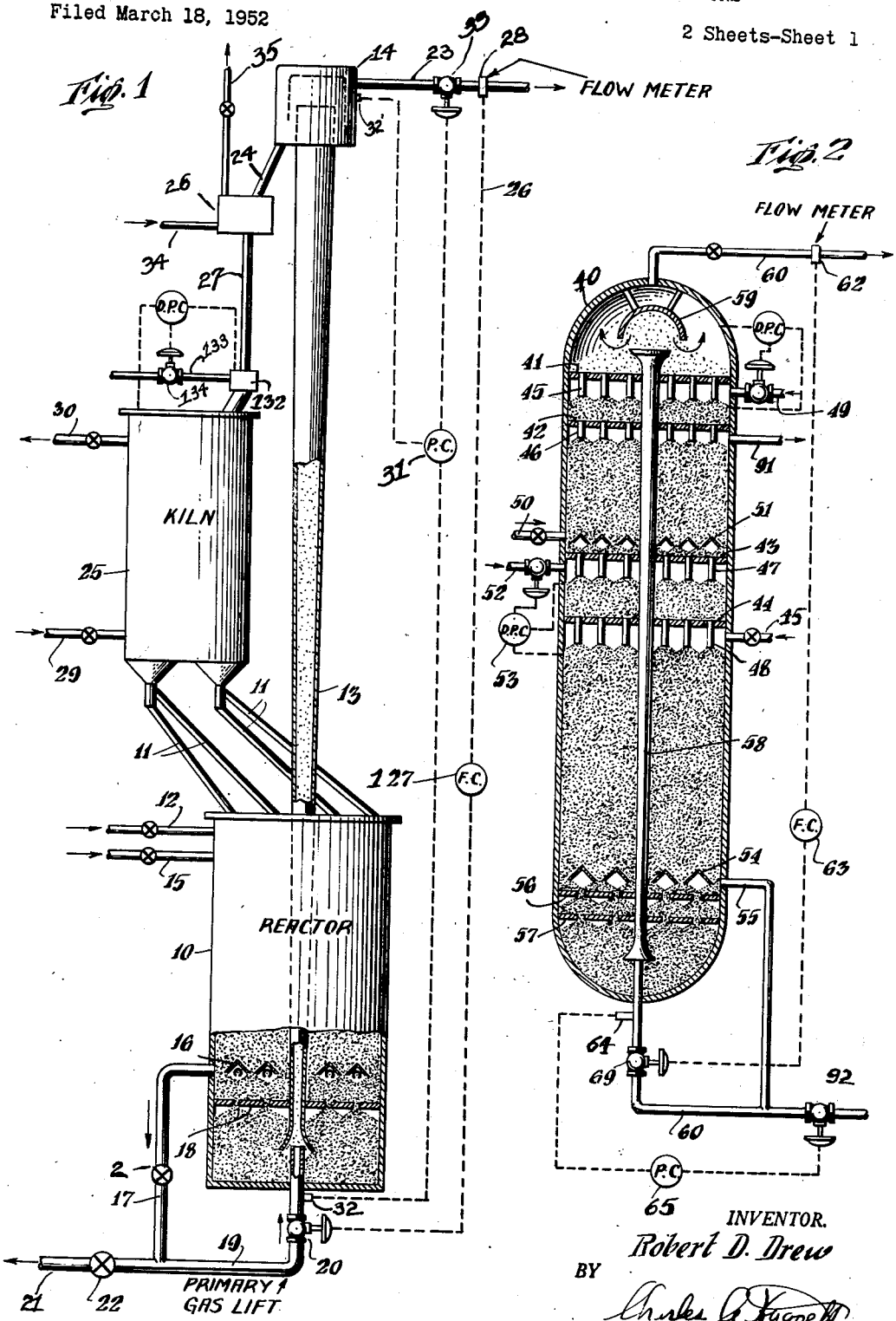
INVENTOR.
Robert D. Drew
BY
AGENT

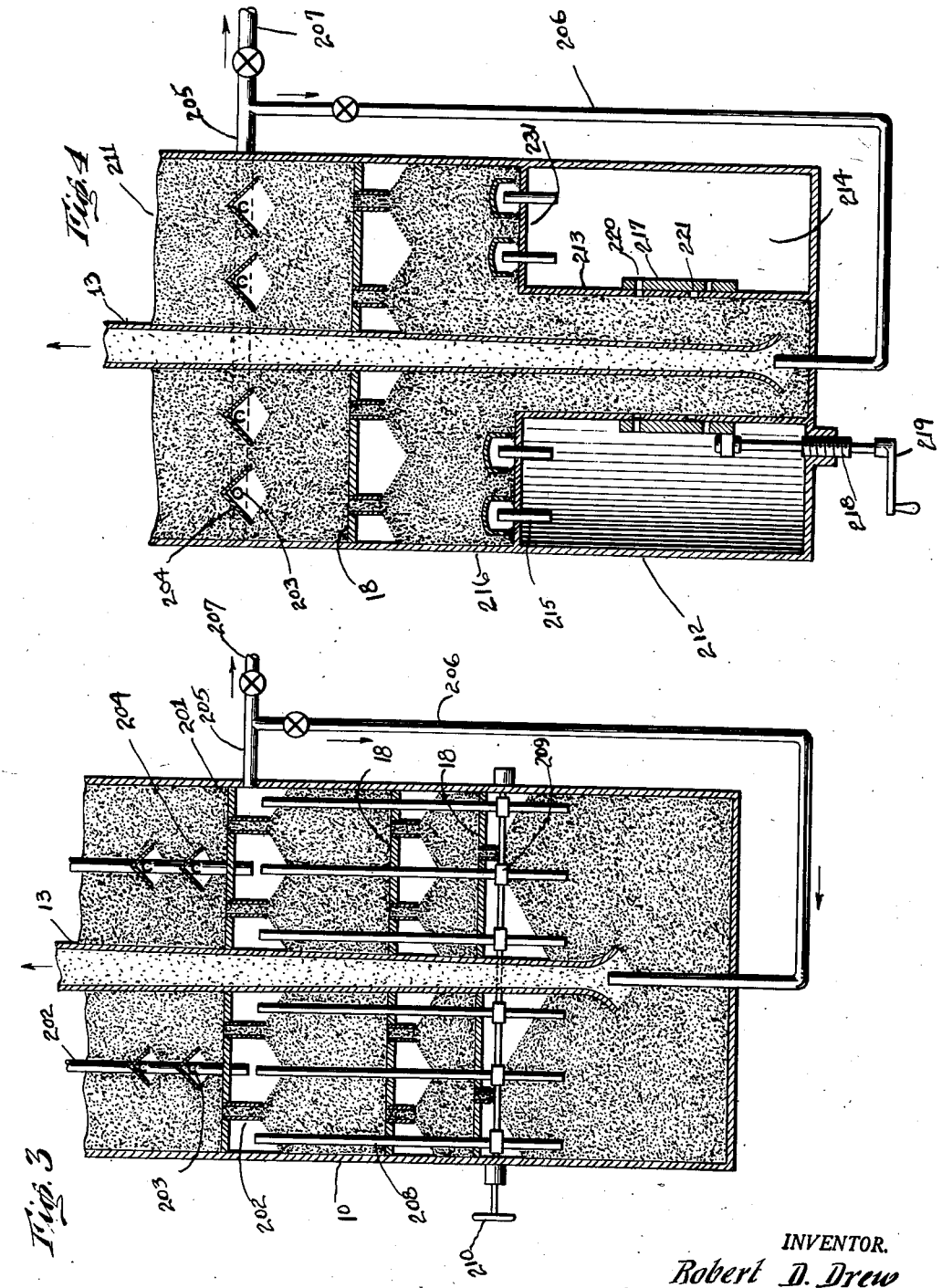

United States Patent Office 2,705,216
Patented Mar. 29, 1955

2,705,216

METHOD AND APPARATUS FOR CONVERTING HYDROCARBONS

Robert D. Drew, Wenonah, N. J., assignor to Socony-Vacuum Oil Company, Incorporated, a corporation of New York Application March 18, 1952, Serial No. 277,145

6 Claims. (Cl. 196—52)

This invention deals with the continuous contacting of fluids with moving masses of granular contact material to effect chemical treatment of the fluids. It is particularly directed to an improved unitary system in which granular solids, either inert or catalytic, are moved cyclically through reaction and reconditioning zones to effect the continuous conversion of hydrocarbons.

The invention may be applied to such processes as catalytic cracking, isomerization, hydrogenation, dehydrogenation, reforming, hydroforming, aromatization, alkylation, cyclicizing, treating and desulfurization of petroleum fractions. Also, the invention may be applied to coking of hydrocarbons in the presence of granular coke or refractory solids, viscosity reducing of petroleum residuums at elevated temperatures, pyrolytic conversion processes such as the conversion of propane and ethane to unsaturated hydrocarbons and of methane to acetylene.

The contact material involved may vary widely in its properties depending upon its use. For catalytic hydrocarbon systems the catalyst may take the form of natural or treated clays, bauxites, inert or active carriers impregnated with certain catalytically active metals or compounds thereof, or synthetic associations of silica, alumina, magnesia, chromia, molybdenum oxide, etc., or combinations thereof to which may be added small amounts of other compounds, usually metallic compounds for specific purposes. When the contact material is employed principally for heat carrying purposes as in pyrolytic conversion processes it may take the form of any of a number of refractory materials such as fused alumina, mullite, Carborundum, zirconium oxide, charcoal etc.; for coking processes the solid material may comprise of a low activity clay catalyst, petroleum coke, pumice or similar materials. The contact material may be in the form of pellets, spheres, tablets, pills or irregular shaped material of palpable particulate form as distinguished from powdered material. It should be understood that the term "granular" as employed herein in describing and claiming this invention is intended to broadly cover any of the above forms of contact material. The contact material involved in this invention may range in size from about 0.005 to 0.5 inch and preferably from about 4–20 mesh by Tyler Standard Screen Analysis. The density of the material as poured into a measuring container may be within the range about 20–130 pounds per cubic foot, and in the case of adsorbents preferably within the range about 25–60 pounds per cubic foot.

In continuous catalytic cracking systems the contact material is passed cyclically through a conversion zone wherein it contacts a hydrocarbon feed at pressures usually above atmospheric and temperatures of the order of 700–1100° F. whereby the feed is converted and then through a regeneration zone wherein a carbonaceous contaminant deposited on the catalyst in the conversion zone is removed by burning. When the granular catalysts are employed it has been found to be highly desirable to maintain the catalyst as a substantially compact bed or column of gravitating particles in the conversion and regeneration zones. Until recently, continuous bucket elevators were employed exclusively to effect transfer of the catalyst between zones in commercial units. Mechanical elevators have been found to impose certain practical limitations on the overall unit height and on the amount of catalyst circulated. As a result, heretofore, all commercial continuous catalytic cracking units of the compact moving bed type have involved side by side arrangement of reactor and kiln thereby requiring two elevators and have involved relatively low catalyst circulation rates. It has been found desirable to increase catalyst circulation rates in order to permit simplification of other parts of the system, particularly the kiln and to arrange the reactor and kiln in vertical series so as to require only a single catalyst transfer step per cycle.

Pneumatic lifts have been developed recently which provide practical pneumatic transfer of the granular contact material in these cyclic conversion systems, in part by delicate control of the gas velocities at various points along the lift. The lifts are disclosed in application for United States Patent Serial Number 210,942, filed February 14, 1951. These lifts involve essentially the use of a continuous vertical lift passage, open at both ends and with the ends projected into feeding and receiving zones, terminated intermediate the top and bottom of each zone. Contact material is gravitated into the feeding zone at the bottom of the lift as a substantially compact mass and travels downwardly about the lower end of the lift passage. A pneumatic transfer gas is introduced into the zone in two streams, a primary and secondary stream. The primary stream is introduced from a point near the bottom of the lift so as to enter the lift without passing through the mass of compacted material, usually directly beneath the lift. The secondary stream is introduced at one or more locations laterally displaced from the centerline of the lift so that it passes through a substantial thickness of the contact material in the feeding zone.

In these conversion systems it is necessary to pump the reactant fluids through the bed of contact material in the conversion zone, usually at advanced pressure found more suitable for conversion. It is also necessary to pump air through the contact mass in the reconditioning zone to effect the burning of the contaminants from the surface of the solid particles. When using a gas lift, it is also necessary to pump gas through the lift to suspend and lift the contact material. It has been proposed that the reactant fluids or the flue gas from the regeneration zone be used to effect the lifting of the particles so as to effect a saving of the pumping and heating expense. This has not been found practical, however, because of difficulties in controlling the flow of the particles through the lift independent of the operation of the reaction or regeneration zones and also because of the excessive attrition which occurred in the lift. I have discovered that these difficulties can be overcome by splitting the reactant or flue gas stream into primary and secondary streams and by withdrawing the primary gas from the mass of contact material and introducing the stream directly into the lift at a rate controlled to maintain the total gas flow through the lift substantially constant while causing the secondary stream to continue flowing through the contact material to enter the lift at a rate controlled to maintain the flow of contact material through the lift constant. The excess fluid can readily be taken to waste or storage as desired.

It is an object of this invention to provide method and apparatus for contacting granular solids in the form of gravitating masses with hydrocarbons to effect conversion and combustion supporting gas to effect reconditioning and using one of the gases to lift the particles to complete an enclosed cyclic system.

It is a further object of this invention to provide a method and apparatus for continuous conversion of hydrocarbons in the presence of moving masses of contact material which overcomes the above-indicated difficulties.

It is a further object of this invention to provide apparatus and method for effecting concurrent contacting of gas with a gravitating compact mass of solid particles in a contacting zone and lifting of the solids from the bottom of the zone by means of the gas flowing through the zone with minimum attrition.

These and other objects will be made more apparent in the following detailed description of the invention, which is to be read in conjunction with the attached sketches. Figure 1 is a showing of a complete cracking system which illustrates the invention; Figure 2 is an alternate embodiment. Figure 3 shows the bottom portion, in cross-section, of apparatus for controlling the flow of granular material through the lift pipe. Figure 4 shows alternate means for controlling the flow of granular material through the lift pipe.

Referring now to Figure 1, there is shown a typical application of this invention in a cyclic continuous moving bed catalytic cracking process. In the drawing there is shown a reactor 10 which is adapted to confine a moving compact bed of catalyst and which internally may incorporate those features by now well known to the art for accomplishing uniform flow, contacting, engaging and disengaging of the catalyst and reactant. Catalyst enters the reactor as one or more gravitating columns through the conduits 11, which may be of the feed leg type shown and claimed in United States Patent Number 2,410,309, or not. The reactor may be operated at a pressure substantially greater than the kiln, in which case the column of contact material in the conduits 11 may then serve as a seal to prevent reactants from moving up the column into the kiln. Where the kiln and reactor are operated at substantially the same pressure the conduits 11 merely serve to transfer the contact material from one vessel to the other and a seal may be readily obtained by introducing a small amount of inert gas into the top portion of the vessel through the conduit 12. Methods of sealing vessels in these systems are now well known in this art and are, therefore, not disclosed in detail.

An upwardly directed lift pipe 13 is centrally located in the reactor 10 and terminated on its lower end at a point near the bottom of the vessel. The lift pipe extends upwardly to an intermediate point in a separation vessel 14, which is positioned a substantial distance above the reactor. Reactant fluids, suitably treated for reaction, are introduced into the vessel through the conduit 15 and travel downwardly through the bed of solids, being converted, at least in part, to the desired hydrocarbons. The feed may be all in vapor form or partially in vapor and liquid form, as desired. A multiplicity of gas collectors 16 are located in the lower portion of the vessel, at a level a spaced distance above the lower end of the lift pipe 13. A portion of the reaction products are collected under the channels and withdrawn from the vessel through the conduit 17. Below the collectors is located one or more horizontal restrictive baffles 18 with spaced apertures passing therethrough for restricted passage of the contact material. The apertures are uniformly distributed across the baffles. The remaining reaction products not withdrawn through the conduit 17 pass downwardly through the apertures in the restrictive baffle 18 to the lower end of the lift pipe 13.

The lift pipe 13 is substantially vertical and open at both ends. The pipe shown is tapered outwardly from bottom to top substantially along its entire length, having its greatest cross-section at its upper end. It has been found that if the average gas and catalyst velocities in the gas lift passage fall below a certain critical minimum, which depends upon certain features of the lift pipe, the catalyst attrition rate will increase very rapidly for even small increments of gas and catalyst velocity decline. On the other hand when the gas and catalyst velocities exceed the critical velocities, the catalyst attrition rate gradually increases but at a substantially lower rate than below the minimum velocity. Details of required gas and catalyst velocity control for efficient transfer of granular material with minimum attrition through substantially vertical passages are shown and claimed in application Serial Number 210,942, filed in the United States Patent Office on February 14, 1951. It is found that generally the gas and catalyst velocities in the lift passage must be reduced in the upper portion of the lift passage to prevent attrition in the upper portion of the lift and in the separation zone. This can be accomplished by tapering the lift outwardly from bottom to top, as shown on the figures. In some instances, however, it is found unnecessary to taper the passage to obtain suitable velocity control. In other instances, velocity control can be obtained by withdrawing gas in controlled amounts at spaced levels along the lift.

The primary gas withdrawn from the bed of contact material through conduit 17 is passed through the conduit 19 and introduced into the lower end of the lift pipe 13 without passing through any substantial thickness of the contact bed beneath the pipe. The flow rate of the primary gas can be controlled by the valve 20. The excess primary gas is withdrawn through the conduit 21 to storage or further processing apparatus, not shown. The flow of products through the conduit 21 may be controlled by the valve 22. The remaining product vapors in the vessel 10 which are not withdrawn through the conduit 17 are forced to pass downwardly through the bed, serving as secondary gas to introduce the contact particles into the lower end of the lift pipe. The partition plate 18 has limited cross section available for transfer of gas and, therefore, the plate inhibits the downward movement of the gas, causing the major portion of the gas to be withdrawn through the conduit 17. The secondary gas pushes the catalyst about the lower end of the lift pipe and mingles with the primary gas in the lower end of the pipe, causing the particles to be conveyed upwardly through the pipe. The lower end of the pipe is preferably flared outwardly to form a mouthpiece. This mouthpiece is preferably flared outwardly along a curve approximately that of a hyperbolic spiral. The design of the flared mouthpiece is disclosed and claimed in detail in application Serial Number 211,343, filed in the United States Patent Office February 16, 1951. The gas and solids pass upwardly through the pipe and are separated in the separator 14. The reaction products are discharge from the upper end of the separator 14 through the conduit 23 to further processing apparatus, not shown. The solids are withdrawn from the bottom of the separator 14 through the conduit 24 either directly to the top of the kiln 25 or to a depressurizer 26. The solids are withdrawn from the depressurizer through the conduit 27 as a continuous column and introduced into the top of the kiln. The vessel 26 may also serve as a stripping chamber. In that event, inert gas is introduced through the conduit 34 and the stripped gases removed through the conduit 35. A flow meter 28 is located in the gas discharge line 23, for measuring the total gas flow through the lift pipe 13. This meter is operably connected to a flow controller 127, adapted to control the valve 20 so as to maintain the total gas flow through the lift substantially constant. It has been found that the pressure drop across the lift pipe is related to the flow rate of the solids through the lift. A pressure controller 31 is operably connected to pressure tap 32 and 32' in the discharge end of the primary pipe 19 and in the separator 14 and the valve 33 in line 23. By maintaining the pressure drop across the lift pipe substantially constant, the ratio of secondary to primary gas is maintained substantially constant. Alternatively, flow controller 127 may be connected to valve 22 and pressure controller 31 may be connected to valve 2 in line 17. An inert seal gas may be introduced into the seal leg 27 through the seal pot 132. The gas is introduced into the seal pot 132 through the conduit 133. The valve 134 in the conduit 133 is automatically operated by a differential pressure controller, introducing a limited amount of seal gas into the seal leg.

The solids pass downwardly through the kiln 25 as a substantially solid column. Combustion supporting gas can be introduced through the conduit 29 to travel upwardly through the column of contact material and burn the contaminants from the surface of the particles. The flue gas can be withdrawn through the conduit 30. Since many types of kilns are available they will not be described herein in detail. Suitable kilns are shown in United States Patents 2,458,434 and 2,458,435 or in United States patent application Serial Number 186,954, filed September 27, 1950. The regenerated contact material is withdrawn from the bottom of the column and transferred through the conduits 11 to the top of the reaction vessel 10. The withdrawal system may suitably be similar to that shown in United States Patent No. 2,546,625, issued March 27, 1951, whereby substantially uniform downward movement of the contact material in the kiln is assured.

Referring now to Figure 2, my invention is shown applied to a compact unit, particularly suited to the needs of the small refiner. A single vertical vessel 40 is used to house superposed reaction and regeneration chambers. Horizontal partition plates 41, 42, 43, 44 are disposed vertically to provide separate zones in the vessel. The plates have groups of depending pipes 45, 46, 47 and 48 adapted to provide particle-free spaces under the plates for easy entrance and exit of gas to and from the column. Between plates 41 and 42 is located a purge zone, inert gas being introduced through the conduit 49 so that at least some of the gas passes upwardly through the drop pipes 45 into the upper end of the vessel 40. The space between plates 42 and 43 serves as a regenerating zone. Combustion supporting gas is introduced through conduit 50 to the gas distributors 51 and flue gas is withdrawn at the top of the zone through the withdrawal conduit 91. The space between plates 43 and 44 is a seal zone. Inert gas is introduced into the zone through the conduit 52 so that at least a portion of the gas passes upwardly through the drop pipes 47 into the regeneration zone above. The space below plate 44 is used as a conversion zone. Reactant fluids are introduced through the conduit 45 to travel downwardly through the bed of contact material. The pressure in the seal zone is maintained slightly higher than the pressure in the reaction zone by means of the differential pressure controller 53. This prevents reactants from rising upwardly through the drop pipes 48. A multiplicity of gas withdrawal channels 54 are located transversely across the vessel for withdrawal of a portion of the reaction products through the conduit 55. Below the channels 54 are located transverse restrictive baffles 56, 57, designed to inhibit the downward movement of the products and force the major portion of the gas out of the vessel through the conduit 55.

A centrally located, open-ended lift pipe is terminated at its lower end below the restrictive baffles and at its upper end above the top partition plate 41. A deflecting baffle 59 is disposed above the upper end of the pipe to turn the issuing gas and solids to a downward direction. The products withdrawn through the conduit 55 are reintroduced into the lower end of the lift pipe 58 through the conduit 60, so as to enter the pipe without passing through any contact bed beneath the pipe. The gas not withdrawn through the conduit 55 passes downwardly through a substantial thickness of the contact bed below the restrictive baffles before entering the lower end of the lift pipe. This gas serves as secondary gas pushing particles into the lower end of the lift pipe where they are lifted up the pipe by means of the gas flow. The reaction products separate from the particles in the region above the partition plate 41 and are withdrawn from the top of the vessel 40 through the conduit 60. The flow meter 62 and flow regulating controller 63 are used to operate valve 69 whereby the total flow of gas through the lift is maintained substantially constant at that value which produces minimum attrition. A pressure regulating controller 65 is connected to pressure tap 64 in conduit 60 to maintain the catalyst circulation rate substantially constant. In response to changes in pressure at the bottom of the lift, the controller 65 operates the valve 92, so as to keep the pressure substantially constant. The flow of contact material is thereby maintained substantially constant. The lift pipe 58 may be tapered, as shown, to provide minimum catalyst attrition in the lift.

The invention may be suitably illustrated by reference to a system of the type shown on Figure 1 operated under the following conditions:

*Example of catalytic cracking unit with internal lift*

Gas oil charge rate _____ 3000 B./D.
Reactor outlet temperature _____ 860° F.
Reactor outlet pressure _____ 10 p. s. i.
Reactor diameter _____ 10 ft.
Lift pipe diameter (bottom) _____ 10 inches.
Catalyst circulation rate _____ 75 tons/hr.
Type of catalyst—chrome bead catalyst _____ 4–10 mesh.
Flow of reactor outlet vapors:
 To fractionation system direct. 1000 B./D.[1] (33%).
 To primary nozzle of lift_____ 1800 B./D. (60%).
 Secondary lift vapor_____ 200 B./D. (7%).

[1] Equivalent reactor charge.

Figure 3 shows an alternate embodiment of the invention. The system is similar to that shown on Figure 1, with the lower section of the reactor 10 being modified as illustrated. Partition plate 201 is located in the lower section of the reactor 10 and has a multiplicity of depending tubes 202 for downward transfer of the solids.

The gas is withdrawn from the bed through the apertures 203 in the vertical pipes 204. The apertures 203 are shielded from the solids by baffles 204. The gas is collected in the particle-free space under the partition plate 201 and most of it is withdrawn from the vessel 10 through the withdrawal conduit 205. A portion of the withdrawn gas is passed through the conduit 206 and the rest is withdrawn through the withdrawal conduit 207 to storage or further processing apparatus, not shown. The pipe 206 carries the primary lift gas and is terminated at the mouth of the lift pipe 13. A portion of the gas in reactor passes downwardly through the bed of solids beneath the partition plate 201. A series of vertical open-ended pipes 208 are located in the lower portion of the vessel 10. The pipes are terminated at their lower ends near the lower end of the lift pipe 13. Restrictive baffles 18, 18 are located across the vessel to inhibit the downward flow of gas through the bed of solids. Valves 209 are located in the pipes 208 and are controlled from the exterior of the vessel by the handle 210. By operation of the handle 210, the flow rate of the gas through the conduits can be adjusted and hence the flow rate of the solids through the pipe can be adjusted to any desired value.

Figure 4 shows an alternate arrangement for effecting control of the secondary gas flow rate. A bed of contact material is located above the lower end of the lift pipe 13 in the vessel 212. A contacting gas is introduced into the upper portion of the vessel 212 and travels downwardly through the bed in contact with the gravitating solid particles. A major portion of the gas is collected under the channels 204 in the lower portion of the vessel and enters the withdrawal pipe 205 through the apertures 203. A substantial height of the compact bed is located between the channels 204 and the lower end of the lift pipe 13. The bottom of the contacting zone is, therefore, in communication with the lower end of the lift passage through a confined, unvented continuous column of gravitating contact material. A small portion of the gas goes downwardly through this column to serve as secondary lift gas. A restricting baffle 18 restricts the flow rate of the secondary gas. In the lower portion of the vessel is a continuous ring baffle 213 and coacting horizontal plate 231 which serve to confine the solid material in a central column about the lift pipe 13 and provide a continuous particle-free chamber 214. Vertical pipes 215 are located in the plate 231 communicating the bed 211 with the chamber 214. Caps 216 are located over the tops of the pipes to prevent solid particles from entering the chamber 214. A sleeve 217 is located about the ring baffle 213 and is designed to be moved vertically by the gears 218 and handle 219. Apertures 220 can be brought out of or into alignment with apertures 221 at various levels by suitably locating the sleeve 217. By this arrangement, the flow rate of the secondary gas can be controlled without changing the pressure in the contacting zone. The primary gas is introduced into the lift pipe as previously described with respect to Figure 3.

In summary, one aspect of this invention involves the contacting of gas with solids in a contact bed provided above the lower end of a lift passage, the bottom of the contacting zone communicating with the lower end of the lift through a confined unvented continuous column of gravitating contact material. Secondary gas is passed downwardly through this column to the lift and the primary gas is taken from that stream of gas entering or leaving the lower end of the contacting zone and introduced directly into the lower end of the lift. The secondary gas flow rate is adjustably controlled independent of the pressure in the contacting zone to effect the desired flow rate of the solids.

Another aspect of the invention involves the continuous conversion of hydrocarbons and combustion of contaminants in reaction and reconditioning zones of a moving bed conversion system with one of the gases, after passage through the zones, being used to convey the particles upwardly through a gas lift. The lift pipe is projected downwardly through the zone to a level substantially beneath the reaction or reconditioning zone and the bottom of the reaction or reconditioning zone is communicated with the bottom of the lift passage through a non-vented uninterrupted column of contact material. Secondary gas flows through the column and primary gas is introduced directly into the lift passage. In the more preferred form of the invention, the gas is passed downwardly through the reaction or reconditioning zone and the major portion of the gas is withdrawn at a level substantially above the bottom of the lift passage. Part of this gas is re-introduced into the lift passage as primary lift gas and the rest is removed from the system. The contact material is gravitated downwardly from the bottom of the reaction or reconditioning zone to the bottom of the lift passage as a non-vented uninterrupted column and the gas not withdrawn from the bottom of the reaction or reconditioning zone is passed downwardly through this column to serve as secondary lift gas. The gas and solids are separated at the top of the lift passage and the solids are purged before being transferred to the other zone.

It is intended that the scope of this invention be considered broadly to cover all changes and modifications of the examples of the invention herein chosen for purposes of the disclosure, which do not constitute departures from the spirit of the invention.

I claim:

1. An improved method of effecting continuous contacting of a fluid with a gravitating mass of granular solids in an enclosed cyclic system which comprises: gravitating solid contact material downwardly as a bed of solids located above the lower end of an upwardly directed lift passage, gravitating solid contact material downwardly from the bottom of the bed to the bottom of the lift passage as a confined, unvented continuous column, introducing a contact fluid into the bed of solid material, passing at least a portion of the fluid through the bed of contact material, withdrawing at least a portion of the fluid from the bed, passing a small portion of the fluid down through the column of contact material at the bottom of the bed to the lower end of the lift passage, so as to serve as secondary gas in moving particles of solid material into the lower end of said lift passage, introducing at least a portion of said withdrawn contact fluid directly into the lower end of the lift passage, so as to serve as primary gas in passing directly up the passage without passage through any substantial thickness of the column of contact material, and adjustably controlling the flow rate of the secondary gas, independently of the pressure in the contact bed of solids, so as to regulate the flow rate of the gravitating contact material in the contact bed.

2. An improved method of effecting the transfer of granular solid contact material in a continuous conversion process which comprises: gravitating solid contact material downwardly in a reaction zone as a substantially compact column toward the bottom of a substantially vertical, open-ended lift passage, the passage being terminated at its lower end a spaced distance below the bottom of the reaction zone, gravitating contact material downwardly from the bottom of the reaction zone as a confined, continuous, unvented column to form a bed of contact material about the lower end of the lift passage, introducing gaseous hydrocarbons into the reaction zone, withdrawing at least a portion of the converted hydrocarbons from the reaction zone at a level spaced apart from the level of gas introduction, introducing at least a portion of said withdrawn converted hydrocarbons as primary gas directly into the lower end of the lift passage, without passing it through the contact material bed about the lower end of the passage, passing a stream of gaseous hydrocarbons downwardly through the unobstructed column of contact material beneath the reaction zone, restricting the downward movement of the gas through the unobstructed continuous column at a level above the lower end of the lift passage, and introducing said gas into the lower end of the lift passage as secondary lift gas, so that the primary and secondary lift gas streams merge in the lift passage and convey the particles up through the passage in the gas stream.

3. An improved hydrocarbon conversion process which comprises: gravitating solid contact material downwardly as a bed of solids located above the lower end of an upwardly directed lift passage, gravitating solid contact material downwardly from the bottom of the bed to the bottom of the lift passage as a confined, unvented continuous column, introducing fluid hydrocarbons into the bed of solid material, passing at least a portion of the fluid hydrocarbons through the bed of contact material, withdrawing at least a portion of the fluid hydrocarbons from the bed, passing a small portion of the fluid hydrocarbons down through the column of contact material at the bottom of the bed to the lower end of the lift passage, so as to serve as secondary gas in moving particles of solid material into the lower end of said lift passage, introducing at least a portion of said withdrawn hydrocarbons directly into the lower end of the lift passage as primary gas, so as to pass directly up the passage without passing through any substantial thickness of the column of contact material, and adjustably controlling the flow rate of the secondary gas, independently of the pressure in the contact bed of solids, so as to regulate the flow rate of the gravitating contact material in the contact bed.

4. An improved hydrocarbon conversion process which comprises: gravitating solid contact material downwardly as a bed of solids located above the lower end of an upwardly directed lift passage, gravitating solid contact material downwardly from the bottom of the bed to the bottom of the lift passage as a confined, unvented, continuous column, introducing fluid hydrocarbons into the top of the bed of solid material, passing the hydrocarbons downwardly through the bed of contact material, withdrawing a portion of the hydrocarbons from the bottom of the bed of solid material, passing the remaining portion of the hydrocarbons downwardly through the column of contact material at the bottom of the bed to the lower end of the lift passage, so as to serve as secondary gas in moving particles of solid material into the lower end of said lift passage, directing at least a portion of the hydrocarbons withdrawn from the bed of contact material into the lower end of the lift passage as primary gas, so as to pass directly up the passage without passing through any substantial thickness of the column of contact material, and adjustably controlling the flow rate of the secondary gas, independently of the pressure in the contact bed of solids, so as to regulate the flow rate of the gravitating contact material in the contact bed.

5. An improved hydrocarbon conversion process which comprises: gravitating solid contact material downwardly as a bed of solids located above the lower end of an upwardly directed lift passage, gravitating solid contact material downwardly from the bottom of the bed to the bottom of the lift passage as a confined, unvented, continuous column, introducing fluid hydrocarbons into the top of the bed of solid material, passing the hydrocarbons downwardly through the bed of contact material, withdrawing a portion of the hydrocarbons from the bottom of the bed of solid material, passing the remaining portion of the hydrocarbons downwardly through the column of contact material at the bottom of the bed, so as to serve as secondary gas in moving particles of solid material into the lower end of said lift passage, passing at least a portion of the secondary gas through laterally confined passages which by-pass at least a portion of the column of contact material between the bottom of the bed and the bottom of the lift passage, directing at least a portion of the hydrocarbons withdrawn from the bed of contact material into the lower end of the lift passage as primary gas, so as to pass directly up the passage without passing through any substantial thickness of the column of contact material, and adjustably controlling the flow rate of the secondary gas through the by-pass passages, so as to regulate the flow rate of the gravitating contact material in the contact bed.

6. An improved method of effecting the transfer of granular solid contact material in a continuous conversion process which comprises: gravitating solid contact material downwardly in a reaction zone as a substantially compact column toward the bottom of a substantially vertical, open-ended lift passage, the passage being terminated at its lower end a spaced distance below the bottom of the reaction zone, gravitating contact material downwardly from the bottom of the reaction zone as a confined, continuous, unvented column to form a bed of contact material about the lower end of the lift passage, introducing gaseous hydrocarbons into the upper portion of the reaction zone, to travel downwardly through the column of contact material, withdrawing a portion of the converted hydrocarbons from the bottom of the reaction zone, introducing a portion of the withdrawn gas as primary lift gas directly into the lower end of the lift passage, without passing it through the contact material bed about the lower end of the passage, passing that portion of the converted hydrocarbons not withdrawn from the reaction zone downwardly through the unobstructed column of contact material beneath that zone, restricting the downward movement of the gas through the unobstructed column, introducing said gas into the lower end of the lift passage as secondary lift gas, so that the primary and secondary lift gas streams merge in the lift passage and convey the particles to a separation zone at the upper end of said passage, withdrawing a stream of contact material from said separation zone, withdrawing a stream of hydrocarbon gas from said separation zone, adjusting the flow rate at which gas is withdrawn from said separation zone, so as to control the flow rate of the secondary gas through the unobstructed column of contact material beneath the reaction zone and adjusting the flow rate of the primary gas to effect minimum attrition of the contact material during upward transfer through the lift passage.

References Cited in the file of this patent

UNITED STATES PATENTS

| | | |
|---|---|---|
| 2,398,759 | Angell | Apr. 23, 1946 |
| 2,459,824 | Leffer | Jan. 25, 1949 |
| 2,541,077 | Leffer | Feb. 13, 1951 |
| 2,561,771 | Ardern | July 24, 1951 |